United States Patent Office 3,095,293
Patented June 25, 1963

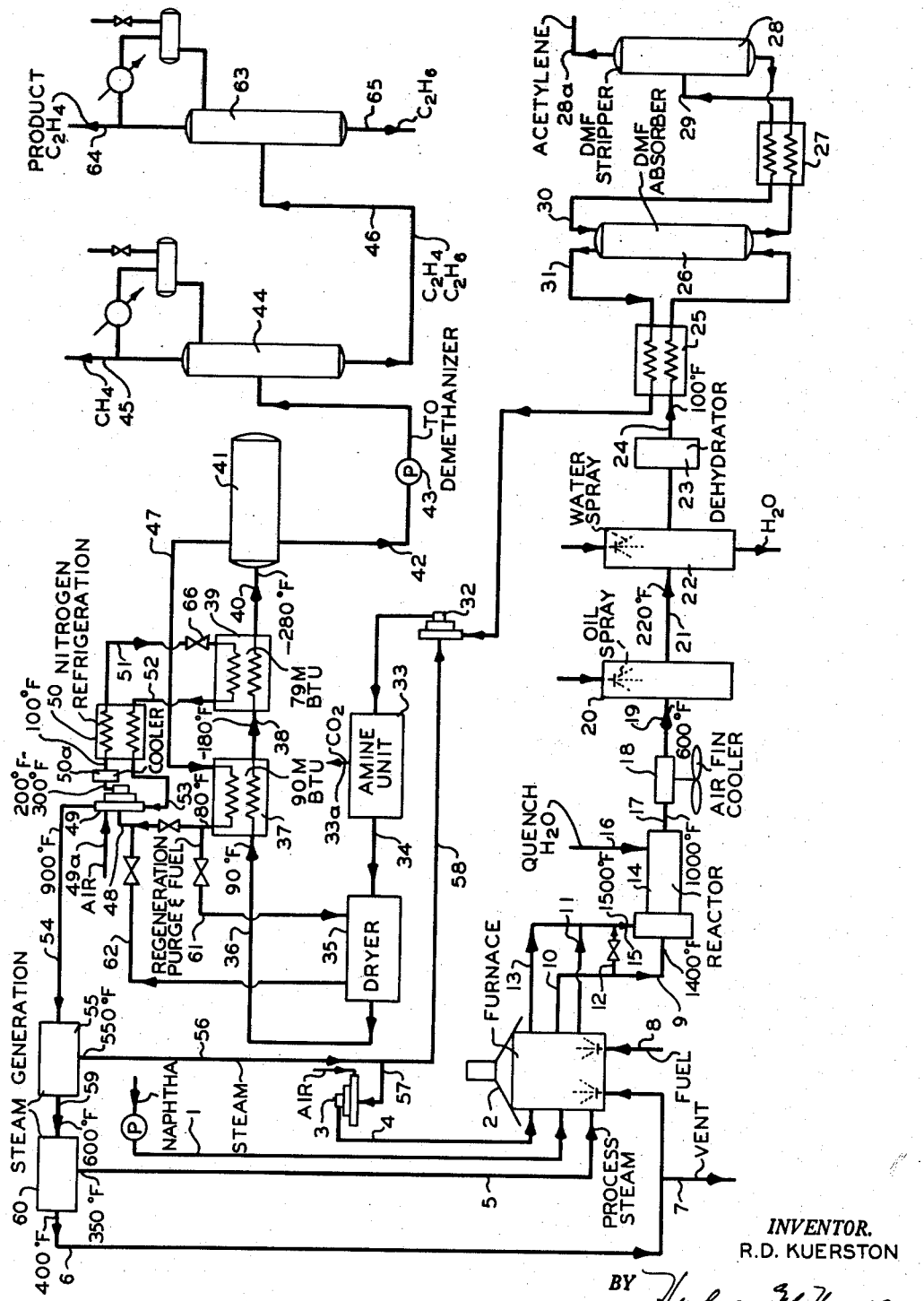

3,095,293
PRODUCTION AND RECOVERY OF ETHYLENE
Richard D. Kuerston, Bartlesville, Okla., assignor to Phillips Petroleum Company, a corporation of Delaware
Filed Nov. 30, 1960, Ser. No. 72,720
4 Claims. (Cl. 62—23)

This invention relates to the production of ethylene. In one aspect it relates to the separation and recovery of ethylene from the effluent of a hydrocarbon conversion operation containing ethylene. In another aspect it relates to the production of ethylene and its separation and recovery from the effluent of a hydrocarbon conversion operation containing ethylene and employing products of the operation as sources of energy.

An object of this invention is to provide a method for the production and recovery of ethylene. Another object of this invention is to provide a method for the separation and recovery of ethylene from the effluent of a hydrocarbon conversion operation containing ethylene. Another object of this invention is to provide a method for the production of ethylene and its separation and recovery from the effluent of a hydrocarbon conversion operation and furthermore employing products of the operation as sources of energy. Yet another object of this invention is to provide such an operation in which products of the operation are used as sources of energy to make the operation as nearly self-sufficient as possible. Still other objects and advantages of this invention will be realized upon reading the following description which, taken with the attached drawing, forms a part of this specification.

The drawing illustrates, in diagrammatic form, an arrangemnt of suitable apparatus parts for practicing the method of this invention.

In the drawing reference numeral 1 identifies a conduit through which a naphtha charge stock is passed to a heating furnace 2. Air for the conversion operation is pumped by a compressor 3 through a conduit 4 for heating in said furnace. Process steam, from a source to be subsequently described, flows through conduit 5, and a combustible gas is passed through a conduit 6 as at least a portion of the fuel to said heating furnace. Air from conduit 4, steam from conduit 5 and naphtha from conduit 1 are separately heated in furnace 2 and these several materials leave the furnace respectively in conduits 13, 11 and 10. The combustible gas from conduit 6 is burned at least in part as fuel in the furnace. That portion of the fuel from conduit 6 not required for heating in furnace 2 is vented in a conduit 7. In case additional fuel is required for furnace 2 such fuel originates from a source, not shown, and flows through a conduit 8 to the furnace. Steam from conduit 11 and naphtha from conduits 10 and 12 are added to the air flowing through conduit 13 prior to entry into an ethylene production furnace 14. Reference numeral 9 identifies a conduit which leads the naphtha charge material not passing through conduit 12 from conduit 10 into the furnace 14 as hydrocarbon feed. Reference numeral 15 identifies a section of conduit through which the mixture of naphtha, steam and air enters furnace 14. Conduit 12 is a valved conduit, the valve being provided for purpose of regulating the rate of flow of combustible material tangentially into the furnace 14.

A furnace suitable for use as the furnace or reactor 14 and its mode of operation are fully described in U.S. Patent 2,750,434. Briefly, the operation of this furnace or reactor involves introduction of a combustible fuel tangentially into a combustion chamber of the furnace. This fuel is introduced into the furnace tangentially and then by continuing such movement a helical blanket or annulus of hot combustion gases is formed and this annulus provides a separating means between the central axial core of the furnace and the sidewalls thereof. The naphtha from conduit 1 which is heated in furnace 2 and is passed therefrom through conduits 10 and 9 enters the furnace axially at the inlet end thereof. This hydrocarbon is the hydrocarbon feed or charge stock. This material enters the furnace axially and flows substantially along the axis through the length of the furnace. In one instance the temperature within furnace 14 is maintained at a value of about 1650° F. and sufficient air and combustible fuel are added tangentially through conduit 15 for maintaining this temperature. In this instance naphtha is added or injected into this furnace through conduit 9 at a rate of about 425 gallons liquid naphtha per hour. Under these conditions the conversion effluent from the furnace flowing through conduit 17 contains around 39 percent ethylene based on the weight of the naphtha charged to the furnace. In another instance 3.96 pound mols of naphtha were fed axially to a furnace, as described in said patent, and 0.56 pound mol naphtha, 6.18 pound mols oxygen, 22.23 pound mols of nitrogen and 17.91 pound mols of steam were fed to the furnace tangentially as fuel. As mentioned, the furnace and its operation are fully described in said patent. In order to arrest reaction to eliminate production of undesired materials quench water is added either into the outlet end of the furnace, as illustrated in the drawing, or if desired the quench water is added to the effluent gases immediately after their exit from the furnace. In the example illustrated herein the effluent of the furnace is water quenched to a temperature of approximately 1000° F. The quenched gases have a pressure of about 20 p.s.i.a. (lbs. per square inch absolute). This quenched effluent is further cooled in an atmospheric air fin cooler 18 to a temperature of about 600° F. This so cooled effluent then passes through a conduit 19 into an oil spray cooler 20 in which oil is sprayed into the stream of hot gases thereby cooling same to a temperature of about 220° F. This oil cooled effluent then passes through a conduit 21 into a water spray vessel 22 in which further cooling is carried out. From this water spray vessel 22 the gases are passed into a dehydrator 23 and therein dehydrated so that in subsequent operations ice will not freeze in the gas stream. This dried furnace effluent leaves the dehydrator at a temperature of about 100° F. and passes through a conduit 24, through a heat exchanger 25 and into the lower portion of absorber vessel 26. This absorber 26 may be maintained at a temperature of around atmospheric or since absorbents are more efficient absorbers at reduced temperatures, it may be desirable to maintain the temperature of the absorbent in vessel 26 at a temperature of around 65° to 70° F. Dimethylformamide is a suitable absorbent for the removal of acetylene from the furnace effluent. The use of this absorbent in the removal of acetylene from cracking furnace gases is described in U.S. Patent 2,146,448. If desired to expedite further solution of the acetylene in the solvent the absorber 26 can be operated under a pressure of from about 1 to about 10 atmospheres. The enriched absorbent dimethylformamide is withdrawn from absorber 26, passed through a conduit 29, which includes a heat exchanger 27, into a stripper vessel 28. In this stripper vessel heat is applied to the kettle section of the vessel and to raise the temperature of the enriched absorbent to such an extent that the acetylene is evolved from the liquid absorbent.

In addition to increasing the temperature of the enriched absorbent for removal of the acetylene the pressure can be reduced or temperature increased and pressure reduced simultaneously. Because of the nature of acetylene it may be desired to expedite stripping of the acetylene from the solvent by bubbling an inert gas, such as hydrogen or nitrogen, through the enriched solution. Such operation is disclosed in said patent describing the use of the dimethylformamide as an acetylene solvent. The stripped acetylene is removed from the stripper through a conduit 28a, for such disposal as desired. The solvent dimethylformamide is withdrawn from stripper 28 and is cooled in the heat exchanger 27 and is passed on through a conduit 30 into the upper portion of absorber 26 as lean absorbent. Gases free from acetylene are removed from the absorber and passed through a conduit 31 and thence are warmed in heat exchanger 25 by heat exchange with feed material enroute to the absorber. The acetylene-free gases are compressed or pumped by a compressor 32 to a pressure of about 50 p.s.i.a. and are passed into an amine treater 33 for removal of carbon dioxide. A conduit 33a is for removal of separated carbon dioxide from the amine treating unit.

The operation of an amine treater will not be described in detail for purposes of brevity and simplicity because the construction, and operation of such a treater is well understood by those skilled in the gas treating art. However, a process suitable for removal of carbon dioxide, as an acidic gas, from other and nonacidic gases is described in U.S. Patent 1,783,901. In this patent ethanolamines are described as acidic solvents. These amines include monoethanolamine, diethanolamine, triethanolamine, and other amines and mixtures of two or more of these amines. Since these amines are ordinarily employed in aqueous solutions for removal of such acidic gases as carbon dioxide, the carbon dioxide free gas is passed from the treater 33 by way of a conduit 34 to a drier 35. This drier can be one employing such desiccants as activated silica, activated alumina or the like. Reference numeral 35, while referring to a single drier, may actually involve two or more vessels with one being on stream while a second is being regenerated by hot purge gases from a source, described hereinafter. The dried furnace effluent ethylene containing gases leave drier 35 through a conduit 36 at a temperature of about 90° F. These dry gases are then chilled in a heat exchanger 37 to a temperature of about −180° F. The so chilled gases pass by way of a conduit 38 to a refrigeration unit 39 in which the gases are chilled to a temperature of about −280° F. This chilling condenses a portion of the hydrocarbons while the remainder and the fixed gases remain in the gaseous form. Thus, a mixture of condensate and uncondensed gases passes through conduit 40 into a phase separator 41. The liquid condensate from separator 41 is withdrawn through a conduit 42 employing a pump 43, if necessary, and passed into a fractional distillation column 44. This column 44 is operated as a demethanizer to remove fixed gases and methane from the liquid phase separated in separator 41. The methane and other gases removed in this fractionator are passed through a conduit 45 and a portion of these gases are condensed and introduced into the column as reflux. The remainder passes out through conduit 45 to such disposal as desired. The bottoms product from fractionator 44 containing ethylene, ethane and minor amounts of other and higher boiling hydrocarbons is removed through a conduit 46 and passed into a fractionator 63. This fractionator 63 is operated to separate ethylene as an overhead product of the process with the remainder of the hydrocarbons including mainly ethane being removed as bottoms product through a conduit 65 for such disposal as desired. That portion of the overhead ethylene required as reflux is so employed with the remainder passing overhead through a conduit 64 as the main product of the process.

The gases separated in the phase separator 41 are passed through a conduit 47 into the above mentioned heat exchanger 37. Since these separated gases are separated at a temperature of about −280° F. they can be used for cooling the discharge material from the drier 35. The gases from conduit 47 are thus heated or warmed considerably in exchanger 37 and the so heated gases therefrom flow through a conduit 48 into a combustion turbine 49 as fuel therefor. If desired, a portion of these combustible gases, since they are quite dry, can be used in regenerating the moist adsorbent in drier 35. Thus, the valves in conduits 61 and 62 are opened, while the valve in conduit 48 is closed or partially closed thereby causing all or a portion of the gases leaving heat exchanger 37 to serve in the regeneration of the adsorbent. Air is admitted to the combustion turbine through a conduit 49a. In this combustion turbine the combustible gases from conduit 48 are burned with the air from conduit 49a in providing hot gases for the production of torque in the turbine. The turbine powers a compression system in a nitrogen refrigeration unit 50. This nitrogen refrigeration unit, including the turbine powered compressor, compresses and cools the refrigerant nitrogen for passage through a conduit 51 and through an expansion valve 66 or an expansion engine with the production of work. A suitable engine is disclosed in U.S. Patent 2,600,494 for providing the final refrigeration in heat exchanger 39. The nitrogen gas after passing through heat exchanger 39 is returned to the refrigeration system 50 by way of a conduit 52 and serves to cool the compressed nitrogen discharged from the compressor. From unit 50 the nitrogen passes through a conduit 53 to the suction side of the turbine compressor. A cooler 50a, such as an air-fin cooler or one utilizing plant cooling water, cools the hot compressed refrigerant from 200°–300° F. to about 100° F.

The hot combustion gases discharged from the turbine portion of the combustion turbine compressor assembly 49 leave this assembly at a temperature of around 900° F. and are passed through a conduit 54 into a steam generator 55. In this generator the hot gases are heat exchanged with water with the resulting production of steam at a temperature of about 550° F. under 300 p.s.i.a. This steam is passed through a conduit 56 and a portion thereof passed through a conduit 57 to provide motive power for the air compressor 3. The remainder of the steam from conduit 56 passes on through a conduit 58 to provide motive power for the compressor 32 for compressing the effluent gases from the absorber 26 from about 15 p.s.i.a. to about 50 p.s.i.a. prior to their entry into the amine treater 33.

After giving up a portion of their heat the combustion gases from the combustion turbine leave the steam generator 55 at a temperature of about 600° F. and are passed through a conduit 59 into a second steam generator 60. This generator provides steam at a temperature of about 350° F. under 50 p.s.i.a. This latter steam is the steam passed through conduit 5 for use in reactor 14. The effluent gases leave generator 60 at a temperature of about 400° F. These latter gases, being combustible, are the gases passed through conduit 6 as a portion of the fuel for furnace 2.

As an example of the operation of this invention are the following tabulations:

TABLE 1

*Constitution of Streams Shown on Drawing (Mols)*

| Stream No. | 17 | 24 | 31 | 34 | 42 | 47 | 46 | 28a |
|---|---|---|---|---|---|---|---|---|
| $N_2$ | 23.23 | 23.23 | 23.23 | 23.23 | 0.67 | 22.56 | | |
| $H_2$ | 8.90 | 8.90 | 8.90 | 8.90 | | 8.90 | | |
| CO | 2.70 | 2.70 | 2.70 | 2.70 | 0.08 | 2.62 | | |
| Methane | 5.50 | 5.50 | 5.50 | 5.50 | 2.92 | 2.58 | .1 | |
| Ethylene | 5.60 | 5.60 | 5.60 | 5.60 | 5.32 | 0.28 | 5.32 | .0 |
| Ethane | 0.24 | 0.24 | 0.24 | 0.24 | 0.24 | | 0.24 | .0 |
| Acetylene | 2.80 | 2.80 | | | | | | 2.8 |
| $CO_2$ | 2.95 | 2.95 | 2.95 | | | | | |
| $H_2O$ | 48.08 | | | | | | | |
| | 100.00 | 51.92 | 49.12 | 46.17 | 9.23 | 36.94 | 5.66 | 2.8 |

TABLE 2

*Constitution of Streams Shown on Drawing (Mols)*

| Stream No. | 54 | 15 | 9 |
|---|---|---|---|
| $N_2$ | 173 | 23.23 | |
| $O_2$ | 32.2 | 6.18 | |
| $CO_2$ | 5.2 | | |
| $H_2O$ (steam) | 14.2 | 17.91 | |
| Naphtha (90 M.W.) | | 0.56 | 3.96 |
| | 224.6 | 47.88 | 3.96 |

Table 1 gives the composition of the effluent gases of reactor 14 flowing through conduit 17 when a naphtha charge stock having a molecular weight of about 90 is charged through conduit 1, furnace 2 and thence on into the conversion furnace 14. Table 2 gives compositions of tangential and axial furnace feeds and turbine effluent gas. A small portion of this naphtha charge is bypassed through conduit 12 as mentioned hereinabove for passage tangentially into the combustion zone of the furnace for providing heat for carrying out the endothermic conversion of the feed stock. This tabulation gives the composition of several streams and each column of the tabulation is headed by a conduit number which identifies the particular conduit in the drawing.

A combustion turbine apparatus suitable for use in this operation is one described in Multi-Stage Centrifugal Compressors, Bulletin 150, pages 42–43, of the Clark Brothers Company, Olean, New York.

Such auxiliary equipment as valves, pressure indicating, recording and control apparatus, temperature indicating, recording, and control apparatus are not shown nor described for purposes of simplicity. Such auxiliary equipment is required in such operations and its need, installation and use are well understood by those skilled in the art.

While certain embodiments of the invention have been described for illustrative purposes, the invention obviously is not limited thereto.

I claim:

1. A process comprising the steps of incompletely burning a hydrocarbon naphtha having an average molecular weight of about 90 in the presence of a deficiency of air for complete combustion thereof and in the presence of steam as subsequently produced, from this burning step withdrawing an effluent comprising $H_2$, $N_2$, CO, $CH_4$, $C_2H_2$, $C_2H_4$, $C_2H_6$, $CO_2$ and $H_2O$, removing the $C_2H_2$ from this effluent in an absorption operation, removing the $CO_2$ from the $C_2H_2$-free effluent in an absorption operation, chilling the $C_2H_2$- and $CO_2$-free effluent by indirect heat exchange with a cold process stream as subsequently produced, further chilling the once chilled stream by indirect heat exchange with an expanding refrigerant as subsequently produced, by these chilling steps condensing at least a portion of the chilled stream, separating a condensate from an uncondensed phase, recovering ethylene from the condensate as the main product of the process, said uncondensed phase being the cold process stream as subsequently produced, withdrawing said process stream from the heat exchange step, burning the withdrawn process stream in a combustion turbine thereby producing power and therewith directly actuating a refrigeration operation whereby a refrigerant is compressed, expanding the compressed refrigerant as said expanding refrigerant as subsequently produced, withdrawing hot gases of combustion from the outlet of said combustion turbine, heat exchanging these withdrawn hot gases with water thereby producing steam, a portion of the produced steam being the above-mentioned steam as subsequently produced.

2. A process comprising the steps of incompletely burning a hydrocarbon naphtha in the presence of a deficiency of air and in the presence of steam as subsequently produced, from this burning step withdrawing an effluent comprising $H_2$, $N_2$, CO, $CH_4$, $C_2H_2$, $C_2H_4$, $C_2H_6$, $CO_2$ and $H_2O$, removing the $C_2H_2$ from this effluent, removing the $CO_2$ from the $C_2H_2$-free effluent, chilling the $C_2H_2$- and $CO_2$-free effluent by indirect heat exchange with a cold process stream as subsequently produced, further chilling the once chilled stream by indirect heat exchange with an expanding refrigerant as subsequently produced, by these chilling steps condensing at least a portion of the chilled stream, separating a condensate from an uncondensed phase, recovering ethylene from the condensate as the main product of the process, said uncondensed phase being the cold process stream as subsequently produced, withdrawing said process stream from the heat exchange step, burning the withdrawn process stream in a combustion turbine thereby producing power and therewith directly actuating a refrigeration operation whereby a refrigerant is compressed, expanding the compressed refrigerant as said expanding refrigerant as subsequently produced, withdrawing hot gases of combustion from the outlet of said combustion turbine, heat exchanging these withdrawn hot gases with water thereby producing steam, a portion of this produced steam being the above-mentioned steam as subsequently produced.

3. A process comprising incompletely burning a hydrocarbon naphtha having an average molecular weight of about 90 in the presence of steam, as subsequently produced, thereby producing a hydrocarbon conversion effluent comprising ethylene and other difficulty condensible components, chilling said effluent by indirect heat exchange with a cold process stream as subsequently produced, further chilling the once-chilled stream and condensing at least a portion thereof by indirect heat exchange with an expanding refrigerant as subsequently produced, from this further chilling and condensing step separating a condensate from an uncondensed phase, recovering ethylene from the condensate as the main product of the process, said uncondensed phase being the cold process stream as subsequently produced, withdrawing said process stream from the heat exchange operation, burning the withdrawn process stream in a combustion turbine thereby producing motive power and therewith directly actuating a refrigeration operation whereby a refrigerant is compressed, expanding the compressed refrigerant as said expanding refrigerant as subsequently produced, withdrawing hot gases of combustion from the outlet of said combustion turbine, and heat exchanging these withdrawn hot gases with water thereby producing steam, a portion of this produced steam being the above-mentioned steam as subsequently produced.

4. The process of claim 3 wherein said refrigerant is nitrogen.

References Cited in the file of this patent

UNITED STATES PATENTS

| 2,265,527 | Hill | Dec. 9, 1941 |
| 2,377,245 | Krejci | May 29, 1945 |
| 2,377,847 | Allen et al. | June 12, 1945 |
| 2,423,156 | Reid | July 1, 1947 |
| 2,769,321 | Stiles | Nov. 6, 1956 |
| 2,813,920 | Cobb | Nov. 19, 1957 |
| 2,900,796 | Morrison | Aug. 25, 1959 |